US008452296B2

(12) United States Patent
Love et al.

(10) Patent No.: US 8,452,296 B2
(45) Date of Patent: May 28, 2013

(54) METHOD AND APPARATUS TO FACILITATE USE OF DEFAULT TRANSMITTER-RECEIVER CONFIGURATIONS

(75) Inventors: Robert Love, Barrington, IL (US); Brian Keith Classon, Palatine, IL (US); Mark Harrison, Grapevine, TX (US); Krishna Kamal Sayana, Lakemoor, IL (US); Kenneth Anderson Stewart, Grayslake, IL (US); Xiangyang Zhuang, Lake Zurich, IL (US); Vijay Nangia, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1022 days.

(21) Appl. No.: 11/764,643

(22) Filed: Jun. 18, 2007

(65) Prior Publication Data
US 2008/0310353 A1    Dec. 18, 2008

(51) Int. Cl.
*H04W 72/00* (2009.01)
(52) U.S. Cl.
USPC ............. 455/450; 455/502; 455/39; 370/329; 370/328; 370/342; 375/299
(58) Field of Classification Search
USPC .......... 375/267, 260, 299, 296, 285; 370/329, 370/328; 455/562, 101, 67.11
See application file for complete search history.

(56) References Cited

U.S. PATENT DOCUMENTS

| | | | |
|---|---|---|---|
| 7,672,674 B2* | 3/2010 | Mahany et al. | 455/452.2 |
| 2005/0032521 A1* | 2/2005 | Lee et al. | 455/450 |
| 2006/0029157 A1* | 2/2006 | Dabak et al. | 375/299 |
| 2006/0154603 A1* | 7/2006 | Sachs et al. | 455/39 |
| 2006/0171482 A1* | 8/2006 | Trachewsky | 375/267 |
| 2006/0209980 A1* | 9/2006 | Kim et al. | 375/267 |
| 2007/0160162 A1* | 7/2007 | Kim et al. | 375/267 |
| 2007/0195809 A1* | 8/2007 | Blanz et al. | 370/426 |
| 2007/0280116 A1* | 12/2007 | Wang et al. | 370/236 |
| 2008/0043867 A1* | 2/2008 | Blanz et al. | 375/260 |
| 2008/0049596 A1* | 2/2008 | Khojastepour et al. | 370/203 |
| 2008/0075033 A1* | 3/2008 | Shattil | 370/328 |
| 2008/0080634 A1* | 4/2008 | Kotecha et al. | 375/267 |
| 2008/0108310 A1* | 5/2008 | Tong et al. | 455/69 |
| 2008/0219376 A1* | 9/2008 | Qi et al. | 375/285 |
| 2008/0268785 A1* | 10/2008 | McCoy et al. | 455/67.11 |
| 2008/0273624 A1* | 11/2008 | Kent et al. | 375/296 |
| 2009/0175161 A1* | 7/2009 | Yi et al. | 370/210 |
| 2009/0252240 A1* | 10/2009 | Kwon et al. | 375/260 |

OTHER PUBLICATIONS

R1-070151—This is a representative of various 3GPP contributions presented in RAN WG1 discussing precoding feedback for frequency selective and non-selective channels.
Hojin Kim et al; "On the Performance of Limtied Feedback Single-/Multi-User MIMO in 3GPP LTE Systems"; XP031152159; Sep. 1, 2006; pp. 684-688.
"3rd Generation Partnership Project; Technical Specification Group Radio Access Network; Physical Layer Procedures (FDD) (Release 7);" 3GPP TS 25.214 V7.5.0, May 1, 2007, 84 pages.
Related International Patent Application No. PCT/US08/67178, Search Report dated Oct. 16, 2008, 3 pages.

* cited by examiner

*Primary Examiner* — Mahendra Patel

(57) ABSTRACT

A wireless communications system base station (101), upon receiving (202) from a mobile station (102) a wireless transmission that comprises a suggested transmitter-receiver configuration, can respond (in appropriate instances) by automatically transmitting (203) to the mobile station a wireless transmission comprising an indication to use instead a default transmitter-receiver configuration. By one approach, the latter action can be based, at least in part, upon a determination regarding reliability (301) of that suggested transmitter-receiver configuration (which might comprise, for example, a direct or indirect measure of quality of the channel by the default transmitter-receiver configuration was received) to provide a corresponding reliability assessment. The latter can then be used (302) to determine whether to use this suggested transmitter-receiver configuration for a subsequent communication with the mobile station.

7 Claims, 3 Drawing Sheets

METHOD AND APPARATUS TO FACILITATE USE OF DEFAULT TRANSMITTER-RECEIVER CONFIGURATIONS

TECHNICAL FIELD

This invention relates generally to wireless communications and more particularly to transmitter-receiver configurations.

BACKGROUND

Wireless communication systems of various kinds are known in the art. Some of these systems make use of statically or dynamically arranged transmitter-receiver configurations. The Universal Mobile Telecommunications System (UMTS) comprises an illustrative example in this regard. In such a system a given transmitter-receiver configuration can be represented as a corresponding precoding matrix indicator or index (often denoted by its acronym, PMI) which serves, for example, to indicate at least one of a transmission rank and/or a valid codebook entry.

In many cases, such a system will accommodate use of any of a variety of transmitter-receiver configurations. This capability, in turn, can be leveraged to facilitate effective management of the communications resources as comprise such a system. For example, by one approach, a given mobile station can propose a given PMI to be used in conjunction with subsequent communications such as a subsequent downlink communication to the mobile station. A receiving base station (such as a so-called Node B in a UMTS environment or an evolved Node B or 'eNode B' or 'eNB' in an Evolved UMTS environment) can indicate its reception and acknowledgement of such a request by echoing that same PMI back to the mobile station.

Though such an approach tends to provide an effective validation mechanism, this benefit comes at a price. For example, echoing the PMI back to the mobile station can result in a considerable amount of layer 1 and layer 2 (L1/L2) control channel overhead especially for larger code-book sizes and if frequency selective precoding is used requiring a separate PMI for each group of channel resources reported on. Given a single L1/L2 downlink control channel embodiment, the resulting fixed PMI overhead can be inefficient for base station and mobile station wireless communications that do not use precoding. Avoiding this inefficiency can also necessitate a relatively complicated L1/L2 control channel design to accommodate such PMI information (since, for example, the number of required bits can vary given frequency selective precoding feedback).

While precoding activities comprise an important and desired behavior, such precoding can lead to undesirable results without a corresponding verification mechanism. As noted above, however, verification carries its own undesirable costs with respect to design and operational requirements.

BRIEF DESCRIPTION OF THE DRAWINGS

The above needs are at least partially met through provision of the method and apparatus to facilitate use of default transmitter-receiver configurations described in the following detailed description, particularly when studied in conjunction with the drawings, wherein.

Figure 1:
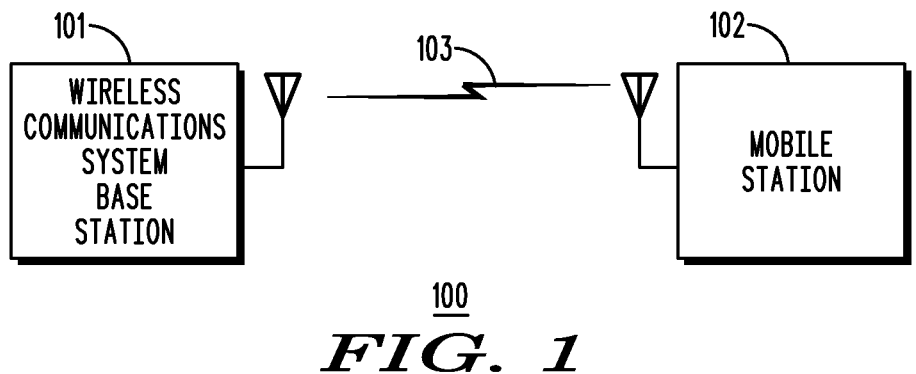
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a wireless communications system base station, upon receiving from a mobile station a wireless transmission that comprises a suggested transmitter-receiver configuration, can respond (in appropriate instances) by automatically indicating to the mobile station to use instead a default transmitter-receiver configuration. By one approach, the latter action can be based, at least in part, upon a determination regarding reliability of that suggested transmitter-receiver configuration (which might comprise, for example, a direct or indirect measure of quality of the channel by which the suggested default transmitter-receiver configuration was received) to provide a corresponding reliability assessment. The latter can then be used to determine whether to use this suggested transmitter-receiver configuration for a subsequent communication with the mobile station.

By one approach, a single bit can serve to represent the conclusions of the wireless communications system base station in this regard. For example, upon determining to use the suggested transmitter-receiver configuration for subsequent communications with the mobile station, the wireless communications system base station can transmit to the mobile station a message comprising, at least in part, only a single bit to indicate this determination to use the suggested transmitter-receiver configuration. Similarly, upon determining to instead use a default transmitter-receiver configuration for subsequent communications with the mobile station, the wireless communications system base station can transmit to the mobile station a message comprising, at least in part, again only a single bit to indicate this determination to use the default transmitter-receiver configuration.

These teachings are highly flexible in practice and can be readily scaled, for example, to accommodate a plurality of candidate default transmitter-receiver configurations if desired. In such a case, for example, each such candidate default transmitter-receiver configuration can be represented by a corresponding single bit indicator, or a multi-bit field representing the different default configuration options. For example, three default configurations may require only 2 bits. There may also be a number of default candidates, where the eNodeB restricts the possible codebook space the mobile station can use via layer 3 (L3) signaling. In another example, via L3 signaling the eNodeB can inform the mobile station that it has the freedom to select its default state from: (a) identity (or other default codebook choice), which may be advantageous if when seeking to avoid feedback from the mobile station; (b) any single stream or rank 1 entry; or (c) any entry. In these cases, it may be possible to indicate via 1 bit of L1/L2 signaling whether the default is being used.

So configured, those skilled in the art will readily understand and appreciate that these teachings provide a mechanism whereby precoding activities can be beneficially used in conjunction with a context that will provide for an effective verification and/or fall-back configuration capability. Those skilled in the art will appreciate in particular that the latter benefit is achieved with very little system overhead requirements and only modest design requirements. In many respects, these approaches will be seen to offer the benefits of prior practices in this regard while incurring only a fraction of the operational costs that would ordinarily be associated with such benefits.

These and other benefits may become clearer upon making a thorough review and study of the following detailed description. Referring now to the drawings, and in particular to FIG. 1, these teachings can be employed in a variety of operational settings. In general, however, these teachings presume the presence of a communications system 100 having at least one wireless communication system base station 101 and at least one (and typically many more) mobile station 102. These two network elements communicate with one another via a corresponding wireless pathway 103 of choice. As one non-limiting example in this regard, the communication system 100 can comprise a Universal Mobile Telecommunications System (UMTS). In such a case, the wireless communication system base station 101 can comprise a so-called Node B or eNode B as will be well understood by those skilled in the art.

In at least some instances, the mobile station 102, in anticipation of receiving a subsequent downlink offering of wireless content, will proffer to the wireless communication system base station 101 (via a corresponding uplink communication) a suggested transmitter-receiver configuration to use when transmitting such subsequent content to the mobile station 102. For example, when the system 100 comprises a UMTS-based architecture and operational configuration as illustratively suggested above, the mobile station 102 can suggest a precoding matrix indicator (PMI) to the wireless communication system base station 101. The following description sets forth various approaches by which such an offering can be usefully employed and accommodated in an effective and efficient manner.

Figure 2:
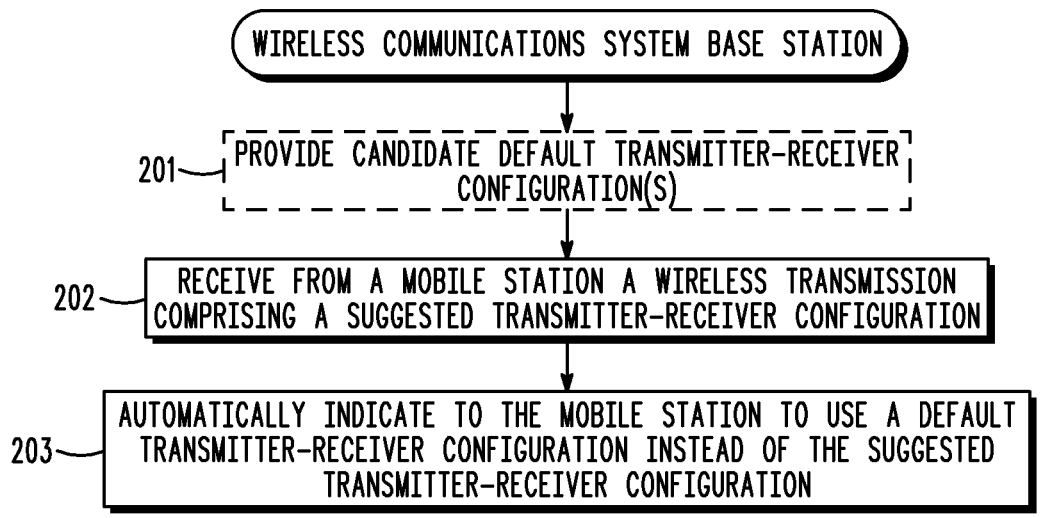
FIG. 2 comprises a flow diagram as configured in accordance with various embodiments of the invention.

Referring now to FIG. 2, by one approach, a corresponding process 200 (implementable, for example, by such a wireless communication system base station 101) can optionally provide for provision 201 of a candidate default transmitter-receiver configuration. If desired, this can comprise providing 201 a plurality of such candidates. To illustrate, this candidate default transmitter-receiver configuration can comprise a candidate default PMI. Such a candidate default transmitter-receiver configuration can comprise, for example, one or more of a transmission rank, a valid codebook entry as was previously identified by the mobile station 102 and/or the wireless communication system base station 101, and/or a transmitter-receiver configuration as corresponds to an average of at least two transmitter-receiver configuration values as had previously been signaled by the mobile station 102. The valid codebook entry may be any valid codebook entry, or may be restricted to certain valid codebook entries (such as, for example, an identity codebook, a valid codebook entry having a certain rank (such as rank 1), and so forth). Those skilled in the art will recognize that this does not comprise an exhaustive listing in this regard and that other possibilities may exist or may be developed hereafter.

Such a default PMI can comprise either a static determination or can comprise a semi-static computation, as desired. The source of this default PMI can vary with the needs and/or opportunities offered in a given application setting. For example, by one approach, the default PMI can be computed or otherwise determined in a central manner and then distributed downwardly to the mobile station. By another approach, the mobile station 102 can compute the default PMI (or some portion thereof) and communicate those results upstream to make the default PMI information available to the communication system's infrastructure. As yet another example in this regard, the relevant network elements can be pre-populated with such content, either at a point of manufacture or prior to deployment by, for example, a system administrator.

Those skilled in the art will recognize and understand that, as presented above, the use of PMI-based examples serves only in an illustrative capacity and is not intended to limit the more general notion of a transmitter-receiver configuration. With that caveat still in mind, those skilled in the art will further recognize that the aforementioned candidate transmitter-receiver configuration might comprise, if desired, a long term PMI that is initially calculated, in whole or in part, at a network element of choice as described above. For example, such a long term PMI could be computed locally at the mobile station 102 and then shared with and received by the wireless communications system base station 101. In the alternative, the long term PMI could be determined locally at the wireless communication system base station 101 and then shared with and transmitted to the mobile station 102.

This process 200 then provides for receiving 202 from the mobile station 102 a wireless transmission comprising, at least in part, a suggested transmitter-receiver configuration such as, and again for purposes only of illustration, a suggested PMI. This suggested transmitter-receiver configuration may, if desired, comprise a given one of the aforementioned plurality of candidate default transmitter-receiver configurations but more typically will likely comprise a configuration that is not represented in that grouping of candidate possibilities. This suggested transmitter-receiver configuration might comprise, for example, a configuration that has been wholly or partially freshly calculated by the mobile station 102.

In a typical application setting, the mobile station's purpose in transmitting this suggested transmitter-receiver configuration is to propose the suggested configuration for use during a subsequent wireless communication (such as, for example, a downlink transmission from the wireless communication system base station 101 to the mobile station 1102). In many cases, use of this proffered suggested transmitter-receiver configuration will represent a useful course of behavior.

In some cases, however, this may not be the case. In such a case, this process 200 can provide instead for responding to receipt of this wireless transmission by automatically indicating 203 to the mobile station 102 to use the aforementioned default transmitter-receiver configuration. When a plurality of candidate default transmitter-receiver configurations are available, this can comprise, for example, indicating a particular one of the candidate default transmitter-receiver configurations from amongst the plurality of candidate default transmitter-receiver configurations to use in lieu of the proffered suggested transmitter-receiver configuration.

By one approach, this indication can comprise a wireless transmission of a one bit indicator. In particular, these teachings will accommodate transmitting to the mobile station 102 a single bit that serves to identify that the mobile station 102 is to use the default transmitter-receiver configuration in lieu of the suggested transmitter-receiver configuration as had been earlier proposed by the mobile station 102.

Figure 3:
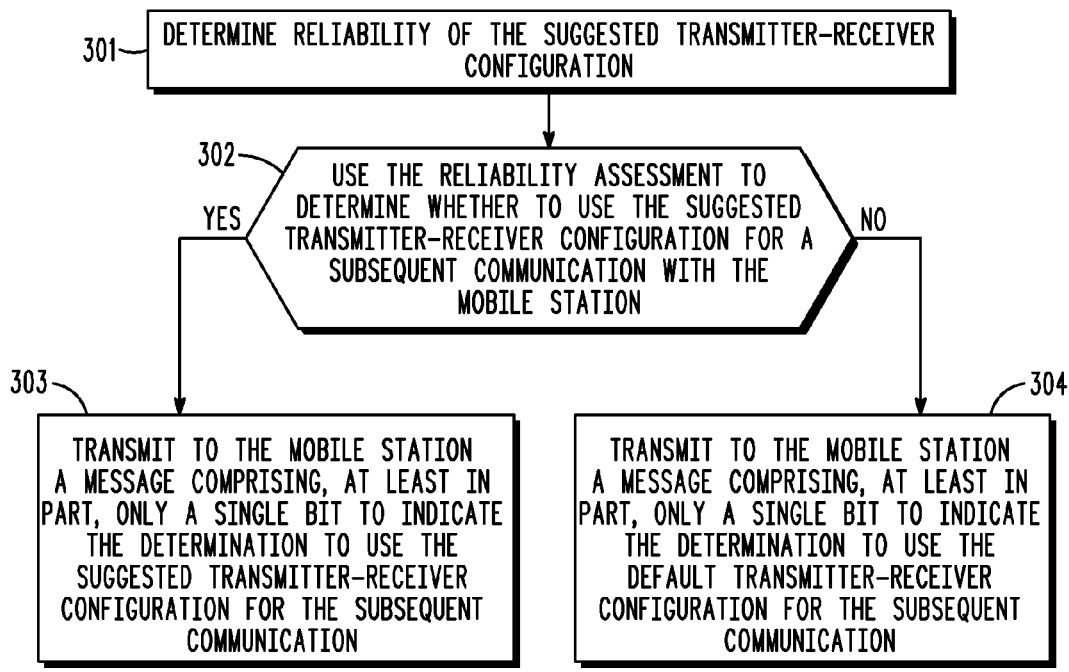
FIG. 3 comprises a flow diagram as configured in accordance with various embodiments of the invention.

As noted above, such a transmission can be based upon some determination that it will be likely preferable to use a default transmitter-receiver configuration rather than a suggested transmitter-receiver configuration. There are various ways by which such a determination can be made. By one approach, and referring now to FIG. 3, some illustrative examples in this regard will be described. Those skilled in the art will recognize that the details of these examples serve an illustrative purpose only and do not comprise an exhaustive example in this regard.

In the illustrated example, the wireless communication system base station 101 can determine 301 reliability of the suggested transmitter-receiver configuration. Such a determination can be accomplished using any of a number of presently available approaches. For example, by one approach, such a determination can be based, at least in part, upon a determination of a signal to noise ratio as corresponds to the suggested transmitter-receiver configuration. When, for example, the signal to noise ratio for the transmission by which the suggested transmitter-receiver configuration was received by the wireless communication system base station 101 is less than some predetermined threshold, the reliability of that suggested transmitter-receiver configuration can be viewed as being unreliable. Similarly, if desired, the signal to noise ratio can be compared against a predetermined threshold to determine whether that signal to noise ratio equals or exceeds some minimal acceptable level. When true, the corresponding suggested transmitter-receiver configuration can be determined to be reliable.

As mentioned above, there are any number of ways by which such reliability can be assessed. Some further particular examples in this regard might include, but are not limited to:

determining a bit error rate as corresponds to the suggested transmitter-receiver configuration;

determining at least one Doppler measurement to facilitate comparing a recent transmitter-receiver configuration with a long term transmitter-receiver configuration average;

determining soft decoding metrics of the block codes that are used for at least one of the transmitter-receiver configuration (particularly when, for example, the latter comprises a PMI) and a channel quality indicator (CQI);

determining a comparison of at least one code word metric with at least one next best code word metric; and/or assessing a block code having a substantially predictable error response; to note but a few examples in this regard.

In general, lower bit error rate and lower Doppler are considered more reliable by many practitioners. With regard to soft decoding metrics or code word metrics, either higher or lower metrics may be considered more reliable, depending on the decoder. For example, a decoder may compare received soft values with a set of stored code words, adding the absolute value of the soft value to a code word metric where it matches the corresponding entry of a stored code word, and subtracting otherwise. By one approach, the code word with the largest metric (best code word) is selected. If the best code word has a very large metric or a metric substantially different than the next best code word, the best code word may be considered more reliable. If the overall metric is small, for example within a given fraction (such as ⅓) of the typical best code word metric, or the second best code word is close to the best code word, for example within twice the average absolute soft information value, the best code word could be deemed unreliable.

In other examples, decoders may produce metrics that are more reliable when they are lower. For example, a decoder may create a metric by adding soft values when the code word is different than the received hard sliced soft information. Here, the lowest metric corresponds to the case where the received soft information directly corresponds to a code word, with a zero metric. Some decoders (such as certain maximum a posteriori (MAP) decoders) may also produce soft outputs for each code word position. In this case, the code word may be viewed as unreliable if at least one (or more than one) of the soft outputs is deemed unreliable, for example, with an output LLR below a target value. Those skilled in the art will recognize that other possibilities exist in this regard with yet others likely to be developed going forward.

The wireless communication system base station 101 can then use 302 that reliability assessment to determine whether to use the suggested transmitter-receiver configuration for subsequent communications with the mobile station 102. Generally speaking, the less reliable the suggested transmitter-receiver configuration, the more likely that this inquiry may be biased towards determining not to use the suggested transmitter-receiver configuration.

Upon determining to use the suggested transmitter-receiver configuration, the wireless communication system base station 101 can then automatically indicate 303 to the mobile station 102 that the suggested transmitter-receiver configuration shall be used as suggested. By one approach, this can comprise transmitting a message to the mobile station 102 that comprises this indication. By one approach, this message and indication does not comprise an echo of the suggested transmitter-receiver configuration. Instead, this indication comprises instead what effectively amounts to a coded representation thereof. As one example in this regard, this indication can comprise only a single bit to indicate the determination to use the suggested transmitter-receiver configuration (where both the wireless communication system base station 101 and the mobile station 102 are appropriately programmed to recognize this single bit of data as representing the indicated state).

Similarly, upon determining to not use the suggested transmitter-receiver configuration, the wireless communication system base station 101 can instead automatically indicate 304 to the mobile station 102 that a default transmitter-receiver configuration is to be used in lieu of the suggested transmitter-receiver configuration. As in the examples above, by one approach, this can comprise transmitting a corresponding message and indication to the mobile station 102 that makes this representation. And again, this representation does not comprise transmitting the default transmitter-receiver configuration itself. Instead, and again as before, this information simply comprises an identifier that directs the mobile station 102 to a particular default transmitter-receiver configuration to which the mobile station 102 already has access. If desired, this relatively brief identifier can again comprise only a single bit indicator.

By one approach, then, it will be seen that a single one bit field in such a message can serve to indicate whether the mobile station 102 is to use the suggested transmitter-receiver configuration or the default transmitter-receiver configuration. By way of illustration and not limitation, for example, a "0" can serve to identify a determination to use the suggested transmitter-receiver configuration while a "1" serves to identify a determination to use the default transmitter-receiver configuration.

As noted earlier, the wireless communication system base station 101 can be provisioned with a plurality of candidate default transmitter-receiver configurations. In such a case, the aforementioned indicator can indicate not only whether to use the suggested or default transmitter-receiver configuration but also which default transmitter-receiver configuration of the plurality of transmitter-receiver configurations should be employed in this regard.

In the examples provided above, system control channel overhead is considerably reduced by avoiding the need to transmit an echoed suggested transmitter-receiver configuration and also by avoiding the need to transmit the enabling specifics of a given default transmitter-receiver configuration. Instead, these choices are directly represented by a corresponding brief indicator which may be as limited as a single bit. If desired, however, these teachings will accommodate an even greater diminution of system resources in this regard. In particular, the aforementioned indicator can be indirectly implied by the configuration of the aforementioned subsequent communication itself.

To illustrate, the wireless communication system base station 101, upon determining to accept the suggested transmitter-receiver configuration, can then simply proceed to use that suggested transmitter-receiver configuration when making the subsequent communication to the mobile station 102 in the absence of providing any specific direct indication to the mobile station 102 in this regard. Similarly, upon determining to reject the suggested transmitter-receiver configuration, the wireless communication system base station 101 can simply proceed to use the default transmitter-receiver configuration when making that subsequent communication (again, in the absence of any specific direct indication to the mobile station 102 regarding this determination).

Upon receiving the subsequent communication, the mobile station 102 could then process the precoded data symbols as comprise that communication using the suggested and default transmitter-receiver configurations, in turn (as necessary), to identify the correct configuration. By one approach, the mobile station 102 could be biased to first attempt using the suggested transmitter-receiver configuration and, should that fail to yield valid data, then attempt using the default transmitter-receiver configuration. When provided with a plurality of candidate default transmitter-receiver configurations, the described approach could be extended to include seriatim attempts to use these various other candidates until valid data results. By another similar approach the mobile station 102 could be biased to first attempt using the suggested transmitter-receiver configuration based on estimated Signal to Interference plus Noise Ratio (SINR) at the base station as inferred by signaled interference levels at the base station over a broadcast channel, the mobile station's power control state (including estimated pathloss given downlink pilot signal power levels as are also broadcast), and downlink CQI.

Figure 4:
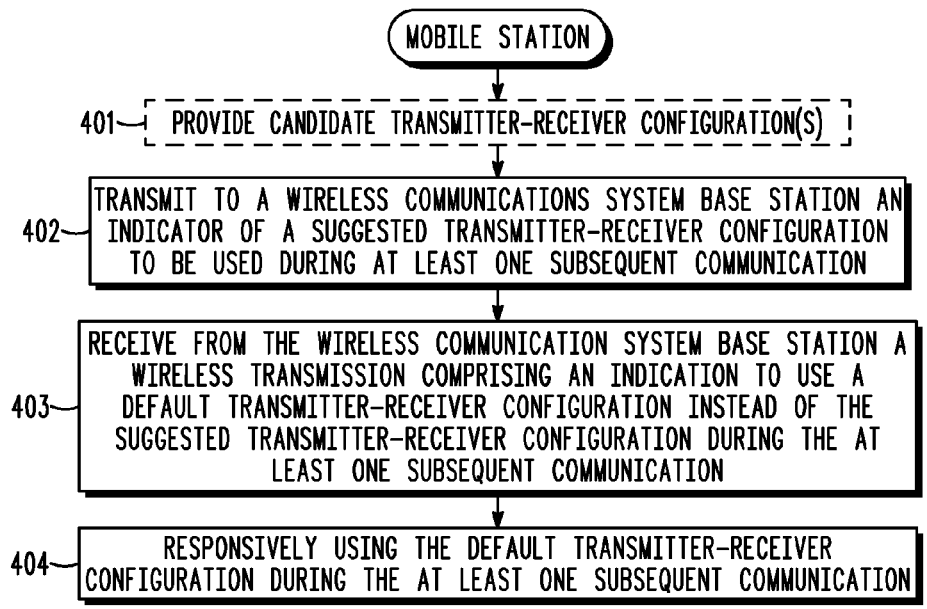
FIG. 4 comprises a flow diagram as configured in accordance with various embodiments of the invention.

Referring now to FIG. 4, a corresponding process 400 for the mobile station 102 can again optionally accommodate providing 401 a plurality of candidate default transmitter-receiver configurations. In a typical application setting, these candidates will include at least one that will match a default candidate as is also provided to the wireless communication system base station 101. If desired, there can be a one-to-one match between each and every such candidate transmitter-receiver configuration as are provided to both the mobile station 102 and the wireless communication system base station 101. One or more of these candidate default transmitter-receiver configurations can be determined and sourced in a first instance by, for example, the mobile station 102 itself, the wireless communication system base station 101, or some other resource as may be available in a given application setting.

This process 400 then provides for transmitting 402 to the wireless communication system base station 101 information regarding a suggested transmitter-receiver configuration (which will typically comprise the suggested transmitter-receiver configuration itself) to be used during at least one subsequent communication. There are various ways and techniques known in the art by which such a suggested transmitter-receiver configuration can be determined by a mobile station. As the present teachings are not particularly sensitive to the selection of any particular approach in this regard, for the sake of brevity further elaboration will not be presented here regarding such choices.

This process 400 then accommodates receiving 403 from the wireless communication system base station 101 an indication to use a default transmitter-receiver configuration instead of the suggested transmitter-receiver configuration during the at least one subsequent communication. (This process 400 can also accommodate receiving an indication to use that suggested transmitter-receiver configuration, though such a step has not been illustrated for the sake of clarity and simplicity.) As noted above, this indication can comprise either a direct, albeit brief, identifier for such an action or an indirect representation as described earlier. Also as noted above, this indication may identify a particular default transmitter-receiver configuration from amongst a plurality of such candidates as may be available to the mobile station 102.

This process 400 then provides for the mobile station 102 responsively using 404 the default transmitter-receiver configuration during the at least one subsequent communication upon having received the aforementioned corresponding indication in this regard. By one approach, for example, as when the indication comprises a one bit indicator, the mobile station 102 may use this indication to prompt retrieving the default transmitter-receiver configuration from local memory.

So configured, a mobile station will be well able to support the teachings set forth herein. This includes, in particular, having a native capability to interact with a wireless communication system base station regarding suggested and default transmitter-receiver configurations in a manner that can result in a significant diminution in system overhead bandwidth usage without otherwise appreciably degrading quality of service.

Figure 5:
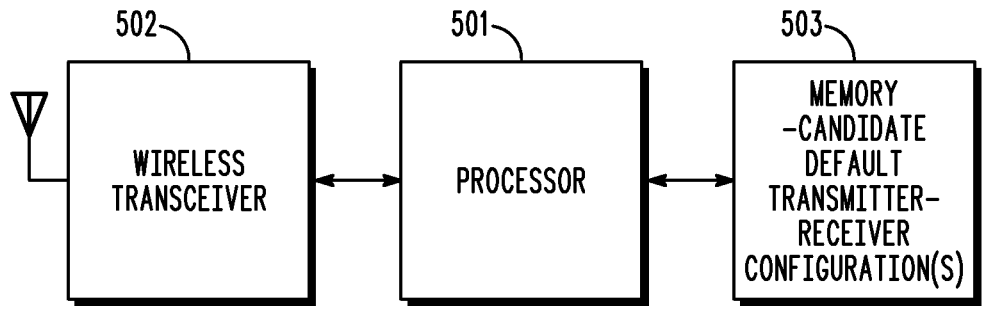
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to a mobile station 102 in particular will now be provided.

In this illustrative example, the mobile station 102 comprises a processor 501 that operably couples to both a wireless transceiver 502 and a local memory 503 that has one or more of the aforementioned candidate default transmitter-receiver configurations stored therein. The wireless transceiver can be configured and arranged as desired to operate compatibly in the communication system 100 in a manner well-understood in the art.

The processor 501 can comprise a partially and/or wholly programmable platform or can comprise a dedicated purpose platform as desired. Those skilled in the art will readily understand how to configure and arrange such a platform to perform one or more functions, actions, and/or steps as are set forth herein. This can comprise, for example, configuring and arranging the processor 501 to transmit to the wireless communications system base station, via the wireless transceiver 502, a suggested transmitter-receiver configuration to be used during at least one subsequent communication, to receive from the wireless communications system base station 101 the aforementioned indications regarding using either the suggested or default transmitter-receiver configuration during that subsequent communication, and then responsively using the indicated transmitter-receiver configuration during that subsequent communication.

Those skilled in the art will recognize and understand that such a mobile station 102 may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 6:
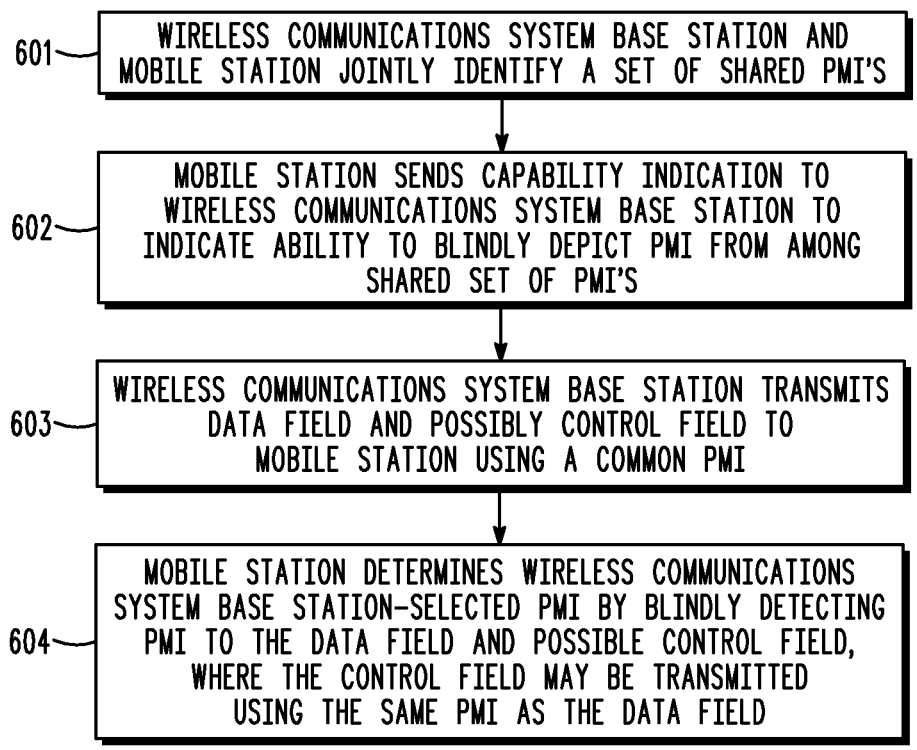
FIG. 6 comprises a flow diagram as configured in accordance with various embodiments of the invention.

Those skilled in the art will recognize and understand that these teachings can be readily applied in a wide variety of application settings. As but one specific instantiation in this regard, and referring now to FIG. 6, consider the following example where an explicit transmission of an indicator from a wireless communications system base station to a mobile station to distinguish between a suggested and a default transmitter-receiver configuration is avoided. As generally alluded to above, the wireless communications system base station and mobile station can be configured so that the mobile station will expect the wireless communications system base station to only select a suggested or a default configuration for transmission (where, for example, these two network elements jointly identify 601 a set of shared PMI's).

The mobile station can then test each hypothesis to blindly identify the wireless communications system base station's selection. If desired, a corresponding process 600 can provide for having the mobile station send 602 a capability indication to the wireless communications system base station to indicate its native ability to blindly detect the PMI from among a shared set of PMI's. The wireless communications system base station can then transmit 603 the corresponding data field (and possibly the corresponding control field) to the mobile station using a common PMI as has been provided above. The mobile station can then determine 604 the particular PMI as has been selected by the wireless communications system base station by blindly detecting the PMI to the data field (and/or possibly the control field, where the control field may be transmitted using the same PMI as the data field).

To now elaborate further by way of illustration, in the Evolved UMTS air interface specification, the mobile station may be provided control information via a Physical Downlink Control Channel (PDCCH). The code word associated with each PDCCH transmission may be additionally encoded with a cyclic redundancy check (CRC) block code, to permit the mobile station to validate the integrity of the PDCCH code word. If the PDCCH is transmitted using, at least in part, the same precoding vector (and hence PMI) as the data symbols transmitted to the mobile station—where the data is transmitted on the Physical Downlink Shared Channel (PDSCH)—the mobile station may test each of the above hypotheses by receiving the PDCCH in accordance with each possible precoding vector (and hence PMI). By one approach, the possible precoding vectors would include those defined by the suggested and default PMI's. The mobile station may also apply a hypothesis test to the data field (that is, the data transmitted via the PDSCH) by examining decoder state metrics, data field CRC, and so forth.

More generally, of course, the mobile station may discriminate between any number of possible precoding vectors by applying the same blind signaling detection method. In other words, the mobile station may use the PDCCH—and associated CRC—as a means of validating a hypothesis test on any candidate precoding vector, so long as a finite set of precoding vectors (and hence PMI's) are shared between the wireless communications system base station and mobile station, and provided the same PMI is applicable, at least in part, between the wireless communications system base station and mobile station. Note also that even if the same PMI is not applied to the data field (i.e. PDSCH) and control field (PDCCH) the mobile station and wireless communications system base station may share a relationship that maps the selection of a PMI for the control field transmission to that used for the data field. Again, direct examination of the received PDSCH data symbols may be sufficient to discriminate between possible PMI's without necessitating recourse to the control symbols transmitted on the PDCCH.

Note that—at least for the Evolved UMTS system—the location in time-frequency of the PDCCH transmission intended for a specific mobile station may itself be subject to hypothesis testing by the mobile station. In this case, the additional computational complexity incurred by the mobile station to blindly hypothesis test the selected precoding vector by inspection of the PDCCH or PDSCH fields may be excessively complex. In this case, the mobile station may signal to the wireless communications system base station its ability to perform the necessary computations to support blind detection of the precoding vector from among a set of precoding vectors, where the set may be, but need not be, restricted to the set comprising the suggested or default precoding vectors and associated PMI's.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, by one approach, the suggested transmitter-receiver configuration and/or the default transmitter-receiver configuration(s) may be updated from time to time as a function, for example, of channel observations. Such dynamic alterations can be effected by either of the mobile station and the wireless communication system base station using locally and/or remotely observed data. As another example in this regard, in a case where frequency selective PMI is being reported, the default PMI could still be indicated by a single bit such that all the subbands would revert to corresponding default PMI. And as yet another example in this regard, a default PMI could also serve to infer a default modulation and coding scheme (MCS) or default modulation and coding rate (MCR) reduction which can be a static or a semi-static variable.

We claim:
1. A method comprising:
at a wireless communications system base station, receiving from a mobile station a wireless transmission comprising a suggested frequency selective transmitter-receiver configuration, wherein the suggested frequency selective transmitter-receiver configuration is indicative of a plurality of precoder matrix indicators (PMIs) for a plurality of frequency sub-bands; and in response to receiving the wireless transmission, indicating to the mobile station to use either the suggested frequency selective transmitter-receiver configuration or a default transmitter-receiver configuration, wherein the default transmitter-receiver configuration is indicative of a single precoder matrix indicator (PMI);

wherein the base station indicates to the mobile station to use a particular default transmitter-receiver configuration from among a plurality of default transmitter-receiver configurations; and wherein the plurality of default transmitter-receiver configurations comprises a configuration that corresponds to an average of at least two transmitter-receiver configurations received from the mobile station.

2. A mobile station comprising:

a wireless transceiver;

a memory having at least one default transmitter-receiver configuration stored therein; and a processor operably coupled to the wireless transceiver and the memory and being configured to:

transmit to a wireless communications system base station, via the wireless transceiver, a suggested transmitter-receiver configuration, wherein the suggested transmitter-receiver configuration is indicative of a plurality of precoder matrix indicators (PMIs) for a plurality of frequency sub-bands;

receive from the wireless communications system base station, via the wireless transceiver, a wireless transmission comprising an indication to use either the suggested transmitter-receiver configuration or a default transmitter-receiver configuration, the default transmitter-receiver configuration is indicative of a single precoder matrix indicator (PMI); and responsively use the default transmitter-receiver configuration;

wherein the memory has a plurality of candidate default transmitter-receiver configurations stored therein;

wherein the wireless transmission includes an indication to use a particular default transmitter-receiver configuration from among the plurality of candidate default transmitter-receiver configurations, wherein the processor is further configured to retrieve from memory the particular default transmitter-receiver configuration; and wherein the plurality of candidate default transmitter-receiver configurations comprises a configuration that corresponds to an average of at least two transmitter-receiver configurations transmitted by the mobile station.

3. The mobile station of claim 2, wherein the processor is further configured to retrieve the default transmitter-receiver configuration from local memory.

4. The method of claim 1, wherein the base station indicates to the mobile station to use only the default transmitter-receiver configuration instead of the suggested frequency selective transmitter-receiver configuration.

5. The method of claim 1, wherein the base station indicates to the mobile station to use either the suggested frequency selective transmitter-receiver configuration or the default transmitter-receiver configuration via a bit field.

6. The method of claim 5, wherein the bit field comprises a single bit.

7. The mobile station of claim 2, wherein the processor is configured to receive from the wireless communications system base station, via the wireless transceiver, a wireless transmission comprising an indication to use only the default transmitter-receiver configuration instead of the suggested transmitter-receiver configuration.

* * * * *